United States Patent [19]

Carberry

[11] 4,091,982

[45] May 30, 1978

[54] METHOD OF CONSTRUCTING A DOUBLE-SIGMOID CONNECTOR

[75] Inventor: John Leonard Carberry, Memphis, Ind.

[73] Assignee: Chemetron Corporation, Chicago, Ill.

[21] Appl. No.: 820,463

[22] Filed: Aug. 1, 1977

Related U.S. Application Data

[63] Continuation of Ser. No. 679,337, April 22, 1976, abandoned.

[51] Int. Cl.² ............................................. F16B 2/00
[52] U.S. Cl. ............................ 228/173 F; 29/150; 403/174; 403/205; 403/406; 285/150
[58] Field of Search ............... 29/157 T, 157 A, 150; 285/150; 403/174, 205, 406; 46/29; 228/173 F

[56] References Cited

U.S. PATENT DOCUMENTS

| 832,408 | 10/1906 | O'Neill | 237/1 R |
| 2,766,513 | 10/1956 | Huet | 29/157 T |
| 3,445,129 | 5/1969 | Penote | 403/174 |
| 4,050,829 | 9/1977 | Glanz | 403/205 |

FOREIGN PATENT DOCUMENTS

| 925,325 | 3/1955 | Germany | 285/150 |

OTHER PUBLICATIONS

"How to Connect Tubing—Cross and Tee Joints", Product Engineering, Jul., 1950, pp. 134–135.

Primary Examiner—Harold D. Whitehead
Assistant Examiner—K. J. Ramsey

[57] ABSTRACT

A method of constructing a double-sigmoid connector from a pair of arcuate elbows comprising the steps of: forming an outlet in a portion of the outer periphery of each of the elbows, said outlet having an annular wall extending outwardly of the outer periphery of each elbow, and welding the outlet walls together.

5 Claims, 1 Drawing Figure

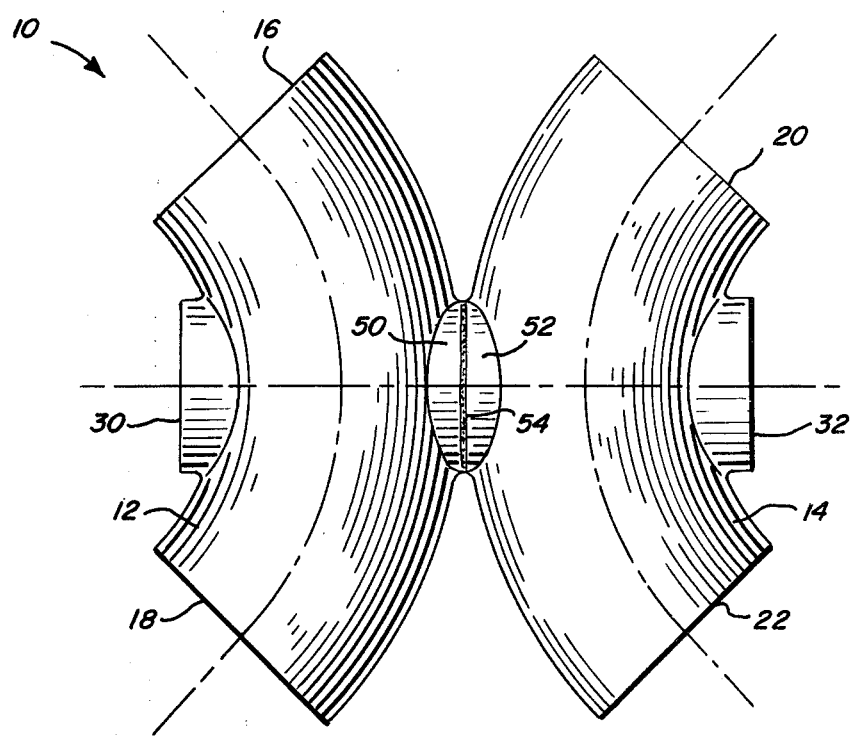

METHOD OF CONSTRUCTING A DOUBLE-SIGMOID CONNECTOR

This is a continuation, of application Ser. No. 679,337 filed Apr. 22, 1976, now abandoned.

BACKGROUND OF THE INVENTION

Cross-reference is made to an application (U.S. patent application Ser. No. 679,335, filed Apr. 22, 1976 and now U.S. Pat. No. 4,050,830) by Robert Charles Paulin and Ronald Joseph Billings, and to an application filed simultaneously therewith by Ronald Paul Glanz, now U.S. Pat. No. 4,050,829, said applications being commonly assigned herewith. As disclosed in said simultaneously filed applications, a double-sigmoid connector has particular utility to interconnect structural members in a trusswork, as in an offshore drilling platform.

SUMMARY OF THIS INVENTION

As an improvement in a double-sigmoid connector comprising a pair of arcuate elbows joined to each other at their outer peripheral midsections, an outlet is formed in each elbow at its outer peripheral midsection and the outlets thus formed are joined to each other to form the connector.

The foregoing and other objects, features, and advantages of this invention are evident from a more detailed description below of an embodiment of this invention, with particular reference to an accompanying drawing:

BRIEF DESCRIPTION OF THE DRAWING

The drawing contains one FIGURE namely, an elevational view of a double-sigmoid connector constituting an embodiment of this invention.

DETAILED DESCRIPTION OF AN EMBODIMENT

In the drawing, a double-sigmoid connector 10 is shown to comprise a pair of arcuate elbows 12 and 14 respectively. Except as noted below, each elbow is identical. Typically, each elbow may be made of forged steel with 48-inch outer diameter and 1.25-inch wall thickness. Each elbow is shown to have a 90° included angle between its ends. Conventional elbows in these sizes have been commercially available from Chemetron Corporation, Tube Turns Division, Louisville, Kentucky 40201, for many years.

In the connector 10, the elbows 12 and 14 have coplanar centerlines, and each elbow has opposite ends normal to its centerlines. The connector 10 is symmetrical about an axis through the midpoints of these centerlines.

Opposite ends 16 and 18 of the elbow 12 and opposite ends 20 and 22 of the elbow 14 are adapted to be connected respectively by circumferential weldments (not shown) to structural pipes (not shown) of suitable diameter and wall thickness. The ends 16 and 18 and the ends 20 and 22 may be beveled in conventional manner as desired to accomodate such weldments.

An outlet 30 of tubular form at its extremity is either drawn or otherwise formed in the elbow 12 at its inner peripheral midsection. An outlet 32 of tubular form at its extremity is similarly formed in the elbow 14 at its inner peripheral midsection. The outlets 30 and 32 are coaxial with the above-mentioned axis through the midpoints of the center-lines of the elbows 10 and 12.

Typically, each outlet may be formed with 36-inch outer diameter and a proportionate wall thickness. These outlets are adapted to be connected by circumferential weldments (not shown) to structural pipes (not shown) of suitable diameter and wall thickness. These outlets 30 and 32 may be beveled. If a four-way interconnection is to be made rather than a six-way interconnection, the outlets 30 and 32 may be omitted.

As so far described, the connector 10 is similar to the double-sigmoid connectors described in the above-mentioned simultaneously filed applications. However, as noted below, this invention allows the elbows 12 and 14 to be joined together in another manner.

An outlet 50 of tubular form at its extremity is either drawn or otherwise formed in the elbow 12 at its outer peripheral midsection. An outlet 52 of tubular form at its extremity is similarly formed in the elbow 14 at its outer peripheral midsection. The outlets 50 and 52 are coaxial with the outlets 30 and 32 and thus with the above-mentioned axis through the midpoints of the centerlines of the elbows 10 and 12.

Typically, each outlet of the outlets 50 and 52 is formed as the outlets 30 and 32 are formed with 36-inch outer diameter and a proportionate wall thickness.

The outlets 50 and 52 are so formed and joined together as to cause the end 16 of the elbow 12 and the end 22 of the elbow 14 and the end 18 of the elbow 10 to define coincident axes. These axes intersect and are normal to each other. Accordingly, the connector 10 advantageously accomodates four pipes in a mutually orthogonal four-way interconnection, as well as two additional lateral pipes if a six-way interconnection is to be made.

The above-mentioned application filed by Paulin et al. mentions various permutations also possible with the connector 10. Similarly, although described above with exemplary dimensions suitable for an offshore drilling platform and other large-scale structures, such connectors can also be made to smaller scales for smaller structures.

I claim:

1. A method constructing a double-sigmoid connector from a pair of arcuate elbows comprising the steps of:
   (a) forming an outlet in a portion of the outer periphery of each of the elbows, said outlet having an annular wall extending outwardly of the outer periphery of each elbow; and
   (b) welding the outlet walls together.

2. The method of claim 1 in which each of said outlets is formed with a wall end lying in a single plane and being beveled toward the outside of said wall.

3. The method of claim 2 in which each of said outlets is formed with a circular wall.

4. The method of claim 3 in which the elbows have coplanar centerlines and right included angles between elbow ends and the elbows are so spaced from each other that an axis tangent to a centerline of an elbow at one end is coincident with an axis tangent to the centerline of the other elbow at an opposing end and the coincident axes of the elbows are generally normal to each other.

5. The method of claim 4 further comprising the step of: forming in a part of the inner periphery of each elbow an outlet having a circular wall extending inwardly of the inner periphery of each elbow that is coaxial with the outlet of said outer periphery.

* * * * *